United States Patent
Harcourt et al.

(10) Patent No.: US 7,144,086 B1
(45) Date of Patent: Dec. 5, 2006

(54) SHOULDER BELT CLIP FOR CHILD SAFETY SEATS AND CHILD CARRIERS

(76) Inventors: John A. Harcourt, P.O. Box 21690, Oklahoma City, OK (US) 73156; William P. Munsell, Jr., P.O. Box 21690, Oklahoma City, OK (US) 73156

( * ) Notice: Subject to any disclaimer, the term of this patent is extended or adjusted under 35 U.S.C. 154(b) by 0 days.

(21) Appl. No.: 10/969,696

(22) Filed: Oct. 18, 2004

Related U.S. Application Data

(60) Provisional application No. 60/512,133, filed on Oct. 17, 2003.

(51) Int. Cl.
*A47F 1/00* (2006.01)
*A44B 11/25* (2006.01)
*A44B 11/26* (2006.01)
*A44B 17/00* (2006.01)
*A62B 35/00* (2006.01)

(52) U.S. Cl. ............. 297/484; 297/250.1; 24/615; 24/629; 24/633

(58) Field of Classification Search ............ 297/250.1, 297/484, 464, 473; 24/163 K, 171, 194, 24/615, 629, 633
See application file for complete search history.

(56) References Cited

U.S. PATENT DOCUMENTS

| | | | | |
|---|---|---|---|---|
| 4,150,464 A | * | 4/1979 | Tracy | 24/313 |
| 4,825,515 A | * | 5/1989 | Wolterstorff, Jr. | 24/625 |
| 5,084,946 A | | 2/1992 | Lee | |
| 5,327,619 A | * | 7/1994 | Ortega | 24/625 |
| 5,380,067 A | | 1/1995 | Turvill et al. | |
| 5,398,997 A | | 3/1995 | McFalls | |
| 5,580,133 A | | 12/1996 | Knox et al. | |
| 5,584,105 A | | 12/1996 | Krauss | |
| D378,070 S | | 2/1997 | Hurd | |
| D389,426 S | * | 1/1998 | Merrick et al. | D11/216 |
| D390,160 S | | 2/1998 | Milligan et al. | |
| 5,839,793 A | | 11/1998 | Merrick et al. | |
| 5,873,635 A | * | 2/1999 | Merrick | 297/484 |

(Continued)

Primary Examiner—Rodney B. White
Assistant Examiner—Stephen Vu
(74) Attorney, Agent, or Firm—Robert M Hunter

(57) ABSTRACT

A shoulder belt clip for restraining a child in a child safety seats or carrier. In a preferred embodiment, the shoulder belt clip is comprised of a plate made of flexible material and with two horizontal slots arranged in parallel on one side and a U-shaped opening on the other. The two straight slots maintain attachment to, but allow the clip to slide vertically on, the webbing that runs over the left shoulder of the child. The U-shaped opening forms a tab that admits entry of the webbing that runs over the right shoulder of the child and holds it until release is desired by the parent. A narrowing of the U-shaped opening causes compression of the webbing between the tab and the opening and thereby prevents slippage of the clip vertically on the webbing that runs over the left shoulder of the child. A lock comprised of a spring-loaded slider is fixed between and parallel to the two straight slots blocks the out-of-plane motion of the tab in the direction that would release the webbing, and also by its positioning prevents sliding the webbing laterally out the open end of the U-shaped opening. When release is desired by the parent, the lock slider is pushed back against the force of the spring and the flexible tab is pushed out-of-plane with respect to the body of the clip. This allows quick release of the webbing that runs over the right shoulder of the child.

21 Claims, 2 Drawing Sheets

U.S. PATENT DOCUMENTS 5,902,016 A  5/1999  Moran et al.
5,908,223 A  6/1999  Miller 6,457,774 B1 * 10/2002 Baloga .................... 297/250.1

* cited by examiner

US 7,144,086 B1

SHOULDER BELT CLIP FOR CHILD SAFETY SEATS AND CHILD CARRIERS

CROSS-REFERENCE TO RELATED APPLICATIONS

This application claims the benefit of U.S. Provisional Patent Application No. 60/512,133, filed Oct. 17, 2003, pending, the disclosure of which application is incorporated by reference as if fully set forth herein

STATEMENT REGARDING FEDERALLY SPONSORED RESEARCH OR DEVELOPMENT

Not Applicable

BACKGROUND OF THE INVENTION

This invention relates to shoulder clips for child restraints. In particular, the invention relates to shoulder clips for harness systems for child safety seats and child carriers.

In the background art, the application of restraint webbing in child safety seats has involved use of approximately 1.5-inch wide loops of webbing in three-, four- and five-point configurations. These configurations rely on centrally located multiple-receiver buckles and a sliding harness clip to join them into a matrix that is meant to provide effective restraint during vehicle (e.g., automobile) collisions. The dangers inherent in these designs include the ease of manipulation of the harness clip by the child occupant, which undermine the efficacy of the restraint system or allow the occupants to escape all together.

The background art is characterized by U.S. Pat. Nos. 5,084,946; 5,380,067; 5,398,997; 5,580,133; 5,584,105; 5,839,793; 5,873,635; 5,902,016; 5,908,223; D378,070; D389,426; and D390,160; the disclosures of which patents are incorporated by reference as if fully set forth herein.

Lee in U.S. Pat. No. 5,084,946 discloses a quick disconnect connector for connecting two belts. This invention is limited in that means are not provided to prevent slipping the connector along the belts.

Turvill et al. in U.S. Pat. No. 5,380,067 discloses a chest harness for use in a child restraint system. This invention is limited in that means are not provided to prevent slipping the connector (shoulder belt connector assembly 44) along the shoulder belts (14, 16) of the invention.

McFalls in U.S. Pat. No. 5,398,997 discloses a seat belt system with a buckle-responsive retractor lock. This invention is limited in that means are not provided to prevent disengagement of the connector (adjustment member 52) from the shoulder belts (shoulder belt portions 42) of the invention. Moreover, means are not provided to prevent slipping the connector along the belts.

Knox et al. in U.S. Pat. No. 5,580,133 disclose a car seat restraint. This invention is limited in that means are not provided to prevent slipping the restraint (14) along the shoulder belts (shoulder straps 28) of the invention.

Krauss in U.S. Pat. No. 5,584,105 discloses a quick disconnect buckle. This invention is limited in that means are not provided to prevent slipping the connector (quick release or disconnect buckle 10) along the shoulder belts or straps of the invention.

Merrick et al. in U.S. Pat. No. 5,839,793 disclose a child seat harness clip. This invention is limited in that releasable means are not provided to prevent slipping the connector (guide connector combination 32) along the shoulder belts (webs 23 and 24) of the invention.

Merrick in U.S. Pat. No. 5,873,635 discloses a child seat harness clip with web lock. This invention is limited in that the same structure is used to connect the two halves of the clip (guides 35 and 36) is also used to prevent slippage of the clip along the shoulder belts (restraint webs 23 and 24) of the invention.

Moran et al. in U.S. Pat. No. 5,902,016 disclose a child restraint harness clip. This invention is limited in that means are not provided to prevent disengagement of the harness clip (26) from one of the shoulder belts (harness straps 22) of the invention.

Miller in U.S. Pat. No. 5,908,223 discloses a child seat restraining system with a tongue assembly. This invention is limited in that means are not provided to prevent slipping the connector (two part adjustment member 128) along the shoulder belts (shoulder portions 118 and 124) of the invention.

Hurd in U.S. Pat. No. Des. 378,070 discloses a child proof seatbelt lock. This invention is limited in that no means for slidably connecting the lock to a seatbelt is disclosed.

Merrick et al. in U.S. Pat. No. Des. 389,436 disclose a contoured harness clip. This invention appears to be the same invention as that disclosed in U.S. Pat. No. 5,873,635 and exhibits similar limitations.

Milligan et al. in U.S. Pat. No. Des. 390,160 discloses a quick release clip. This invention is limited in that no means for slidably connecting the lock to a seatbelt is disclosed.

Although some background art shoulder belt clips do significantly improve the safety of child safety seats when compared to others, none of individual references and no combination of the references cited above disclosure or suggest the features of the invention disclosed herein.

BRIEF SUMMARY OF THE INVENTION

A purpose of the invention is to provide a child-resistant shoulder belt clip system for a child restraint harness comprising webbing shoulder straps. A preferred embodiment of the clip system serves to prevent disengagement of the harness as well as sliding of the clip along the webbing by the child occupant.

The invention is a shoulder belt clip for restraining a child in a child safety seat or child carrier. In a preferred embodiment, the shoulder belt clip is comprised of a plate made of flexible material having two straight horizontal slots arranged in parallel on one side and a U-shaped opening on the other. The two straight slots preferably maintain attachment to, but allow the clip to slide vertically on, the webbing that runs over the left (or right) shoulder of the child. The U-shaped opening preferably forms a tab that admits entry of the webbing that runs over the right (or left) shoulder of the child and holds it until release is desired by the parent.

In a preferred embodiment, a narrowing of the U-shaped opening causes compression of the webbing between the tab and the opening, thereby preventing slippage of the clip vertically on the webbing that runs over both shoulders of the child. A lock that is preferably comprised of a spring-loaded slider is fixed between and disposed substantially parallel to the two straight slots and blocks the out-of-plane motion of the tab in the direction that would release the webbing, and also, by its positioning, prevents sliding the webbing laterally out the open end of the U-shaped opening. In a preferred embodiment, when release is desired by the parent, the lock slider is pushed back against the force of the spring and the flexible tab is pushed out-of-plane with respect to the body of the clip. This allows quick release of the webbing that runs over the right shoulder of the child.

In a preferred embodiment, the invention is a harness clip for a child safety seat or child carrier harness, said harness comprising a first belt that holds one shoulder of the child in the child safety seat or child carrier and a second belt that holds the other shoulder of the child in the child safety seat or child carrier when said child safety seat or child carrier is in use, said harness clip comprising: a plate comprising a first side and a second side and having two straight slots on said first side and a U-shaped slot on said second side, said U-shaped slot forming a tab that is normally disposed in substantially the same plane as said plate, said two straight slots accommodating the first belt and said U-shaped slot accommodating the second belt; and a slider slidably attached to said plate that is operative to prevent said tab from moving out of the plane of said plate when said slider is in the engaged or locked position, thereby preventing the movement of the second belt through or out of said U-shaped slot. Preferably, said slider is housed in a housing that is disposed between said two straight slots, said housing containing a spring that urges said slider into a locked position. Preferably, said spring is selected from the group consisting of: a compression-type spring; and an extension-type spring. Preferably, the harness clip further comprises: a prong that is attached to said slider and that provides a user with a means for moving said slider in to a disengaged or unlocked position. Preferably, said slider comprises a male end and said tab has a female end into which said male end engages when said slider is in the engaged or locked position.

In another preferred embodiment, the invention is a clip for a child safety seat or child carrier harness, said harness comprising a first belt that holds one shoulder of the child in the child safety seat or child carrier and a second belt that holds the other shoulder of the child in the child safety seat or child carrier, said clip comprising: a plate comprising a first side and a second side and having means for accommodating a belt on said first side and means for releasably accommodating another belt on said second side, said means for releasably accommodating another belt comprising a tab that is normally disposed in substantially the same plane as said plate, said means for accommodating a belt accommodating the first belt and said means for releasably accommodating another belt accommodating the second belt; and a slider slidably attached to said plate that is operative to prevent said tab from moving out of the plane of said plate when said slider is in the engaged or locked position, thereby preventing the movement of said second belt through or out of said means for releasably accommodating another belt. Preferably, said slider is housed in a housing that is mounted on said first side, said housing containing a spring that urges said slider into an engaged or locked position. Preferably, the clip further comprises: a prong that is attached to said slider and that provides a user with a means for moving said slider in to a disengaged or unlocked position. Preferably, said slider comprises first connection means and said tab comprises second connection means with which said first connection means engages when said slider is in said engaged or locked position.

In another preferred embodiment, the invention is a clip for a child safety seat or child carrier harness, said harness comprising a first belt that holds one shoulder of the child in the child safety seat or child carrier and a second belt that holds the other shoulder of the child in the child safety seat or child carrier, said clip comprising: a plate comprising a first side and a second side; means for slidably accommodating the first belt that is attached to said first side and that slidably connects the first belt to said plate; means for releasably accommodating the second belt that is attachable to said second side and that releasably connects the second belt to said plate, said means for releasably accommodating the second belt comprising a slider and a spring that urges said slider toward a position that prevents the release of the second belt from said plate. Preferably, said means for accommodating the second belt comprises means for preventing said means for accommodating the second belt from moving relative to said plate when said slider is in said position that prevents the release of the second belt from said plate. Preferably, said slider comprises first connection means and said means for accommodating the second belt comprises second connection means with which said first connection means engages when said slider is in said position that prevents the release of said second belt from said plate.

In another preferred embodiment, the invention is a child safety seat comprising a harness clip disclosed herein. In yet another preferred embodiment, the invention is a vehicle comprising a child safety seat disclosed herein wherein the child safety seat is built into the vehicle. In another preferred embodiment, the invention is a child carrier comprising a clip disclosed herein.

In another preferred embodiment, the invention is a method for securing a child in a child safety seat, said method comprising: placing the child in the child safety seat; placing a left shoulder belt that is secured to the child safety seat over the left shoulder of the child; placing a right shoulder belt that is secured to the child safety seat over the right shoulder of the child; buckling a first portion of a buckle to which said left shoulder belt and a left lap belt extending over the left leg of the child are secured and buckling a second portion of a buckle to which said right shoulder belt and a right belt extending over the right leg of the child are secured to a third portion of said buckle to which a crotch belt is secured; adjusting a harness clip mounted on said left shoulder belt to about the chest level of the child, said harness clip having a U-shaped slot and comprising a slider that is biased in a locked position by a spring; retracting said slider and threading the right shoulder belt into the U-shaped slot with the right shoulder belt entering the top of said U-shaped slot from the back of the harness chip and entering the bottom of said U-shaped slot from the front of said U-shaped slot; and releasing said slider so that it moves to said locked position that prevents said right shoulder belt from being released from said U-shaped slot and from sliding in said U-shaped slot.

In another preferred embodiment, the invention is a method for securing a child in a child safety seat, said method comprising: placing the child in the child safety seat; placing a left shoulder belt that is secured to the child safety seat over the left shoulder of the child; placing a right shoulder belt that is secured to the child safety seat over the right shoulder of the child; adjusting a harness clip mounted on one of said shoulder belts, said harness clip having a U-shaped slot and comprising a slider that is biased in a locked position by a spring; retracting said slider and threading the other of said shoulder belts into the U-shaped slot with the other of said shoulder belts entering the top of said U-shaped slot from the back of the harness chip and entering the bottom of said U-shaped slot from the front of said U-shaped slot; and releasing said slider so that it moves to said locked position that prevents the other of said shoulder belts from being released from said U-shaped slot and from sliding in said U-shaped slot.

In another preferred embodiment, the invention is a method for securing a child in a child safety seat, said method comprising: placing a left shoulder belt that is secured to the child safety seat over the left shoulder of the child; placing a right shoulder belt that is secured to the child safety seat over the right shoulder of the child; adjusting a harness clip mounted on one of said shoulder belts, said harness clip having a U-shaped slot and comprising a slider that is biased toward a locked position by a spring; retracting said slider and placing the other of said shoulder belts into said U-shaped slot; and releasing said slider so that it moves to said locked position that prevents the other of said shoulder belts from being released from said U-shaped slot.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

BRIEF DESCRIPTION OF THE SEVERAL VIEWS OF THE DRAWINGS

The features of the invention will be better understood by reference to the accompanying drawings which illustrate presently preferred embodiments of the invention. In the drawings.

Figure 1:
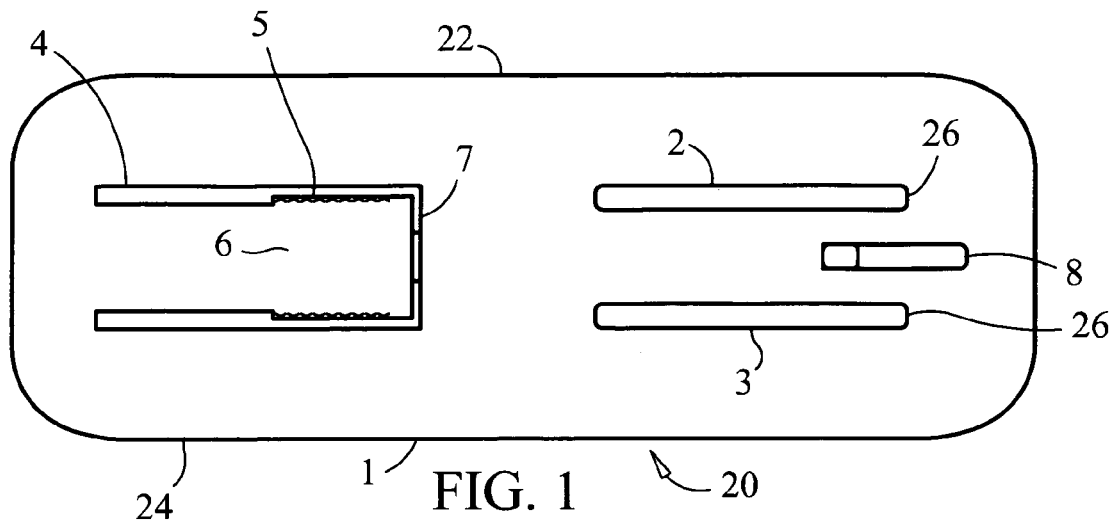
FIG. 1 is an elevation view of the front side of a preferred embodiment of the invention.

The following reference numerals are used to indicate the parts and environment of the invention on the drawings:

1 plate
  2 first horizontal slot
  3 second horizontal slot
  4 U-shaped slot
  5 narrowing
  6 tab
  7 open end
  8 prong slot
  9 spring-loaded slider, slider
  10 area
  11 lock housing
  12 smaller cavity
  13 larger cavity
  14 spring
  15 prong
  20 shoulder belt clip, harness clip, clip
  22 first portion
  24 second portion
  26 ends
  28 socket
  30 car safety seat or child carrier
  32 right shoulder webbing
  34 left shoulder webbing

DETAILED DESCRIPTION OF THE INVENTION

Figure 2:
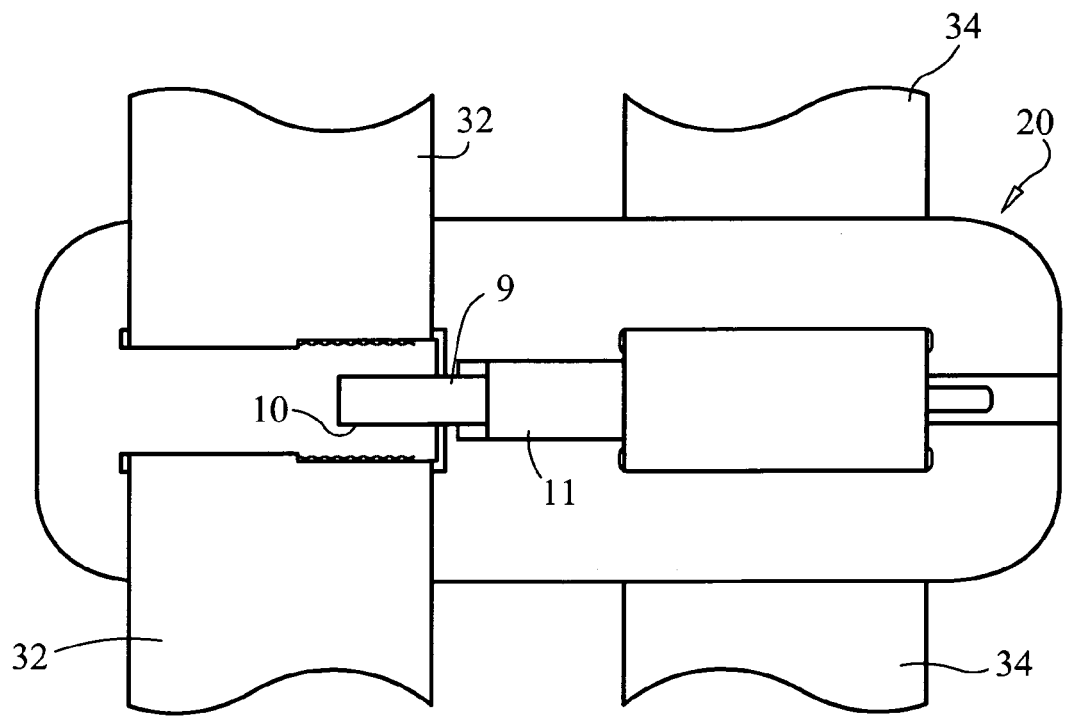
FIG. 2 is an elevation view of the back side of a preferred embodiment of the invention.

Referring to FIGS. 1 and 2, of a preferred embodiment of shoulder belt clip 20 is presented. Shoulder belt clip 20 is used in conjunction with the webbing portion of a harness for securing a child occupant in child safety seat or child carrier 30. The webbing portion comprises two belts, a first belt that is oriented substantially vertically and extends over one shoulder of the child occupant and a second belt that is oriented substantially vertically and extends over the other shoulder of the child when child safety seat or child carrier 30 is in use. When shoulder belt clip 20 is in use, it is oriented substantially horizontally and connects the first belt and the second belt at approximately the chest level of the child occupant.

In a preferred embodiment, shoulder belt clip 20 is comprised of plate 1 which is preferably made of flexible material, such as a thermoplastic, e.g., high density polyethylene or polypropylene. Plate 1 comprises first portion 22 and second portion 24 and has first horizontal slot 2 and second horizontal slot 3 arranged substantially in parallel on first portion 22 and U-shaped opening 4 on second portion 24.

In the preferred embodiment shown from the rear of clip 20 in FIG. 2, left shoulder webbing 34 that extends over the left shoulder of the child occupant of a child safety seat or child carrier 30 is preferably threaded in (from front to back) first horizontal slot 2 and out (from back to front) horizontal slot 3. In this way, slots 2 and 3 maintain an attachment to, but allow clip 20 to slide vertically on, the webbing that runs over the left shoulder of the child. In alternative embodiments, other means for accommodating left shoulder webbing 34 and connecting it to clip 20 are provided (e.g., a bracket (not shown) extending substantially perpendicularly outward from the front side or back side of first portion 22 of clip 20 having a substantially horizontally-oriented slot therein).

Right shoulder webbing 32 runs over the right shoulder of the child occupant. U-shaped opening 4 forms flexible tab 6, that, when bent out of U-shaped opening 4, admits entry of right shoulder webbing 32. Right shoulder webbing 32 is preferably threaded out (from back to front) of the top of U-shaped slot 5 and in (from front to back) the bottom of U-shaped slot 5. Right shoulder webbing 32 is held in U-shaped slot 4 until release of the child from the restraint is desired by the parent. Narrowing 5 of U-shaped opening 4 compresses the webbing between tab 4 and the edge of U-shaped opening 4 and thereby prevents slippage of clip 20 vertically on the webbing that runs over the shoulders of the child. In a preferred embodiment, the edges of tab 6 are roughened to increase their coefficient of friction.

In a preferred embodiment, a label (not shown) on clip 20 or on the child safety seat or child carrier warns the parent not to slip the right shoulder webbing under tab 6, that is, not to thread right shoulder webbing in (from front to back) of the top of U-shaped slot 5 and out (from back to front) the bottom of U-shaped slot 5.

In a preferred embodiment, a lock comprised of spring-loaded slider 9 is attached to plate 1 between and substantially parallel to horizontal slots 2 and 3. When engaged (locked), slider 9 protrudes into area 10 of plate 1, located immediately adjacent to tab 6, thereby blocking the out-of-plane (in or front to back) motion of tab 6 in the direction that would allow sliding of the webbing in U-shaped slot 4, and also, by its positioning, preventing releasing of the webbing laterally out of open end 7 of U-shaped opening 4.

When release of the child occupant from the child safety seat or child carrier is desired by the parent, slider 9 is pushed back by moving prong 15 against the force of spring 14 and them pushing flexible tab 6 out of plane with respect to plate 1. This allows quick lateral release of the webbing that runs over the right shoulder of the child. Prong slot 8 allows prong 15 to extend through plate 1 to the front side of clip 20. Lock housing 11 comprises smaller cavity 12 which accommodates slider 9 and larger cavity 13 which accommodate slider 9 and spring 14. In one embodiment, spring 14 is a compression-type spring and in another embodiment spring 14 is an extension-type spring.

Figure 3:
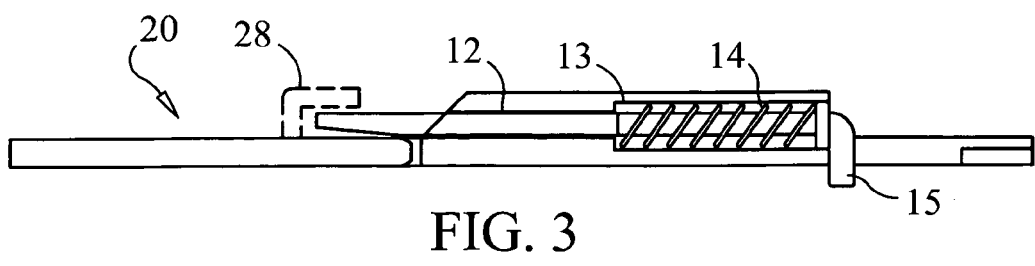
FIG. 3 is a longitudinal cross-sectional view through the slot of a second preferred embodiment of the invention.
Figure 4:
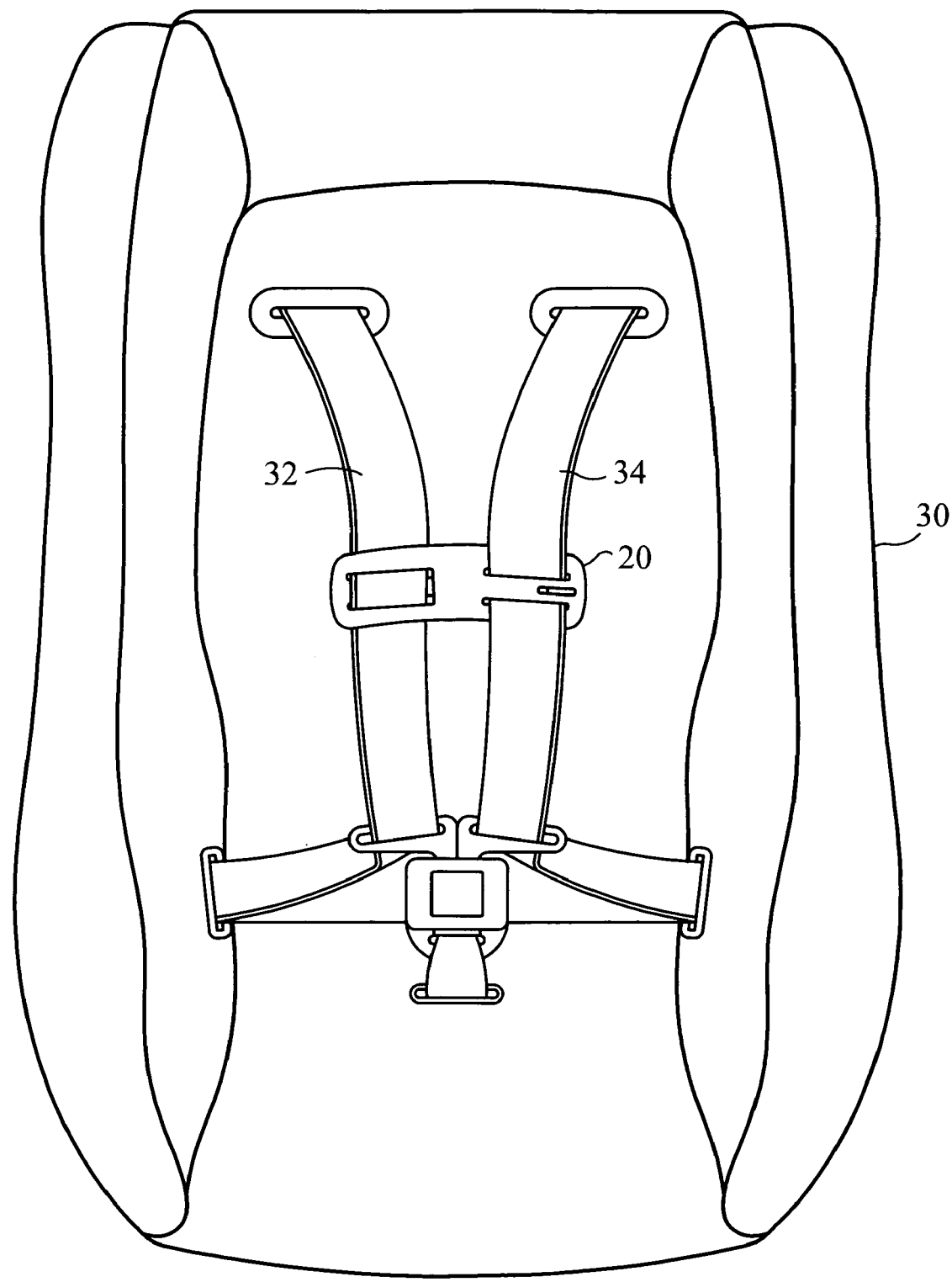
FIG. 4 is a front elevation view of a child safety seat having a harness with a preferred embodiment of the invention installed on it.

In an alternative embodiment, plate 1 has a length that is greater than that shown on FIGS. 1–3 and prong slot 8 is located essentially completely beyond ends 26 of horizontal slots 2 and 3. In this embodiment, prong slot 8 and horizontal slots 2 and 3 do not overlap vertically as they do in the embodiments shown on FIGS. 1–3. In this embodiment, the left shoulder webbing (not shown) that extends over the left shoulder of the child occupant of the child safety seat or child carrier may be threaded out (from back to front) first horizontal slot 2 and in (from front to back) horizontal slot 3.

In another alternative embodiment, when slider 10 is extended (in the locked position), the male end of slider 10 engages with a female end or socket 28 (shown in dashed lines in FIG. 3) on the end of tab 6, thereby preventing tab 6 from moving out-of-plane with respect to plate 1 in either direction (in or out). In this embodiment, the parent may thread the right shoulder webbing in (from front to back) of the top of U-shaped slot 5 and out (from back to front) the bottom of U-shaped slot 5 or vise versa. In a preferred embodiment, another label (not shown) on clip 20 warns the parent to ensure that clip 20 is in the locked position (with the male end of slider 10 engaged with the female socket on the end of tab 6) before the child safety seat or child carrier is used. A person having ordinary skill in the art will recognize that other structures could be used to ensure that slider 10 engages with tab 6 in a way that would prevent tab 6 from moving out of plane with respect to plate 1. For example, slider 10 could have a forked end or slider 10 could have a male end and tab 6 could have a female end or slider 10 could have a female end and tab 6 cold have a male end, etc.

In another preferred embodiment, the invention is a child safety seat or child carrier that comprises a harness clip disclosed herein. For example, the invention is the child safety seat of U.S. Pat. Nos. 5,380,067; 5,398,997; 5,580,133; 5,839,793 or 5,873,635 with a harness clip disclosed herein substituted for the harness clip disclosed in that patent. In another preferred embodiment, the invention is a vehicle that comprises a child safety seat disclosed herein. For example, the invention is a vehicle into which the vehicle seat comprising the built-in child safety seat disclosed in U.S. Pat. No. 5,398,997 is mounted with a harness clip disclosed herein substituted for the harness clip disclosed in that patent.

Many variations of the invention will occur to those skilled in the art. Some variations include positioning U-shaped opening 4 on the right side of plate 1. Other variations call for positioning of U-shaped opening 4 on the left side of plate 2. All such variations are intended to be within the scope and spirit of the invention.

What is claimed is:

1. A harness clip for a child safety seat or child carrier harness, said harness comprising a first belt that holds one shoulder of the child in the child safety seat or child carrier and a second belt that holds the other shoulder of the child in the child safety seat or child carrier when said child safety seat or child carrier is in use, said harness clip comprising:

a plate comprising a first portion and a second portion and having two straight slots on said first portion and a U-shaped slot on said second portion, said U-shaped slot forming a tab that is normally disposed in substantially the same plane as said plate, the first belt being threadable through said two straight slots and the second belt being threadable through said U-shaped slot; and a slider slidably attached to said plate that is adapted for preventing said tab from moving out of the plane of said plate when said slider is in the engaged or locked position, thereby preventing the movement of the second belt through or out of said U-shaped slot.

2. The harness clip of claim 1 wherein said slider is housed in a housing that is disposed between said two substantially parallel straight slots, said housing containing a spring that urges said slider to slide into a locked position.

3. The harness clip of claim 2 wherein said spring is selected from the group consisting of:

a compression-type spring; and an extension-type spring.

4. The harness clip of claim 2 further comprising:

a prong that is attached to said slider and that provides a user with a means for sliding said slider relative to said housing into a disengaged or unlocked position.

5. The harness clip of claim 1 wherein said slider comprises a male end and said tab has a female end into which said male end engages when said slider is in the engaged or locked position.

6. A clip for a child safety seat child carrier harness, said harness comprising a first belt that holds one shoulder of the child in the child safety seat or child carrier and a second belt that holds the other shoulder of the child in the child safety seat or child carrier, said clip comprising:

a plate comprising a first portion and a second portion and having means for passing a belt through said plate that is disposed on said first portion and means for releasably passing another belt through said plate that is disposed on said second portion, said means for releasably passing another belt through said plate comprising a tab that is normally disposed in substantially the same plane as said plate, said first belt being threadable through said means for passing a belt through said plate and said other belt being threadable through said means for releasably passing another belt through said plate; and a slider slidably attached to said plate that prevents said tab from moving out of the plane of said plate when said slider is in the engaged or locked position, thereby preventing the movement of said second belt through or out of said means for releasably passing another belt through said plate.

7. The harness clip of claim 6 wherein said plate is an undivided plate and said means for releasably passing another belt through said undivided plate has a first slot portion and a second slot portion and a third slot portion that is substantially perpendicular to said first and second slot portions.

8. The clip of claim 6 wherein said slider is housed in a housing that is mounted on said first portion, said housing containing a spring that urges said slider into an engaged or locked position.

9. The clip of claim 6 further comprising:
a prong that is attached to said slider and that provides a user with a means for moving said slider into a disengaged or unlocked position.

10. The clip of claim 6 wherein said slider comprises first connection means and said tab comprises second connection means with which said first connection means engages when said slider is in said engaged or locked position.

11. A harness clip for a child safety seat or child carrier harness, said harness comprising a first belt that holds one shoulder of the child in the child safety seat or child carrier and a second belt that holds the other shoulder of the child in the child safety seat or child carrier, said clip comprising:
a single unitary one-piece plate comprising a first portion and a second portion;
means for slidably passing the first belt through said single unitary one-piece plate, said means for slidably passing the first belt through said single unitary one-piece plate being attached to said first portion and slidably connecting the first belt to said single unitary one-piece plate;
means for releasably passing the second belt through said single unitary one-piece plate, said means for releasably passing the second belt through said single unitary one-piece plate being attachable to said second portion and releasably connecting the second belt to said single unitary one-piece plate, said means for releasably passing the second belt through said plate comprising a slider and a spring that urges said slider toward a position that prevents the release of the second belt from said single unitary one-piece plate.

12. The clip of claim 11 wherein said means for passing the second belt through said single unitary one-piece plate comprises means for preventing said means for passing the second belt through said single unitary one-piece plate from moving relative to said single unitary one-piece plate when said slider is in said position that prevents the release of the second belt from said plate.

13. The clip of claim 11 wherein said slider comprises first connection means and said means for passing the second belt through said single unitary one-piece plate comprises second connection means with which said first connection means engages when said slider is in said position that prevents the release of said second belt from said single unitary one-piece plate.

14. A child safety seat comprising:
a seat portion having a seat support and back support;
a harness portion comprising a first belt that holds one shoulder of the child in the seat and a second belt that holds the other shoulder of the child in the seat when said child safety seat is in use; and
the harness clip of claim 1.

15. A vehicle comprising:
an automobile;
the child safety seat of claim 14;
wherein the child safety seat is built into the automobile.

16. A child carrier comprising:
a seat portion having a seat support and back support;
a harness portion comprising a first belt that holds one shoulder of the child in the seat and a second belt that holds the other shoulder of the child in the seat when said child carrier is in use; and
the harness clip of claim 1.

17. A method for securing a child in a child safety seat, said method comprising:
placing the child in the child safety seat;
placing a left shoulder belt that is secured to the child safety seat over the left shoulder of the child;
placing a right shoulder belt that is secured to the child safety seat over the right shoulder of the child;
buckling a first portion of a buckle to which said left shoulder belt and a left lap belt extending over the left leg of the child are secured and buckling a second portion of a buckle to which said right shoulder belt and a right belt extending over the right leg of the child are secured to a third portion of said buckle to which a crotch belt is secured;
adjusting a harness clip mounted on said left shoulder belt to about the chest level of the child, said harness clip comprising an undivided plate having a single U-shaped slot therein and comprising a slider that is biased in a locked position by a compression-type spring or an extension-type spring;
retracting said slider and threading the right shoulder belt into the U-shaped slot with the right shoulder belt entering the top of said U-shaped slot from the back of the harness clip and entering the bottom of said U-shaped slot from the front of said U-shaped slot; and
releasing said slider so that it moves to said locked position that prevents said right shoulder belt from being released from said U-shaped slot and from sliding in said U-shaped slot.

18. A method for securing a child in a child safety seat, said method comprising:
placing the child in the child safety seat;
placing a left shoulder belt that is secured to the child safety seat over the left shoulder of the child;
placing a right shoulder belt that is secured to the child safety seat over the right shoulder of the child;
adjusting a harness clip mounted on one of said shoulder belts, said harness clip having a U-shaped slot and comprising a slider that is biased in a locked position by a compression-type spring or an extension-type spring;
retracting said slider and threading the other of said shoulder belts into the U-shaped slot with the other of said shoulder belts entering the top of said U-shaped slot from the back of the harness chip and entering the bottom of said U-shaped slot from the front of said U-shaped slot; and
releasing said slider so that it moves to said locked position that prevents the other of said shoulder belts from being released from said U-shaped slot and from sliding in said U-shaped slot.

19. A method for securing a child in a child safety seat, said method comprising:
placing a left shoulder belt that is secured to the child safety seat over the left shoulder of the child;
placing a right shoulder belt that is secured to the child safety seat over the right shoulder of the child;
adjusting a harness clip mounted on one of said shoulder belts, said harness clip having a U-shaped slot and comprising a slider that is biased toward a locked position by a compression-type spring or an extension-type spring;
retracting said slider and placing the other of said shoulder belts into said U-shaped slot; and
releasing said slider so that it moves to said locked position that prevents the other of said shoulder belts from being released from said U-shaped slot.

20. The harness clip of claim 1 wherein said plate is an undivided plate and said U-shaped slot has a first slot portion and a second slot portion that are substantially parallel and a third slot portion that is substantially perpendicular to said first and second slot portions.

21. A harness clip for a child safety seat or child carrier harness, said harness clip comprising:

a plate comprising a first portion and a second portion and having two straight slots on said first portion and a U-shaped slot on said second portion, said U-shaped slot forming a tab that is normally disposed in substantially the same plane as said plate, said two straight slots accommodating a first belt that holds one shoulder of the child in the child safety sear or child carrier when said child safety seat or child carrier is in use and said U-shaped slot accommodating a second belt that holds the other shoulder of the child in the child safety seat or child carrier when said child safety seat or child carrier is in use; and a slider slidably attached to said plate that prevents said tab from moving out of the plane of said plate when said slider is in the engaged or locked position, thereby preventing the movement of the second belt through or out of said U-shaped slot;

wherein said slider is housed in a housing that is disposed between said two substantially parallel straight slots, said housing containing a spring that urges said slider to slide into a locked position; and wherein said spring is selected from the group consisting of:

a compression-type spring; and an extension-type spring.

* * * * *